United States Patent [19]

Ahn

[11] Patent Number: 5,486,966
[45] Date of Patent: Jan. 23, 1996

[54] HEAD DRUM GROUND SYSTEM FOR USE IN A VIDEO CASSETTE RECORDER

[75] Inventor: Seong-Ick Ahn, Seoul, Rep. of Korea

[73] Assignee: Daewoo Electronics Co., Ltd., Seoul, Rep. of Korea

[21] Appl. No.: 294,529

[22] Filed: Aug. 22, 1994

[30] Foreign Application Priority Data

Aug. 24, 1993 [KR] Rep. of Korea ............. 93-16474

[51] Int. Cl.$^6$ .................. G11B 5/52; G11B 5/027
[52] U.S. Cl. .............................. 360/107; 360/84
[58] Field of Search ............. 360/128, 130.24, 360/107, 84, 108; 361/212, 220

[56] References Cited

U.S. PATENT DOCUMENTS

| | | | |
|---|---|---|---|
| 4,031,558 | 8/1975 | Kusaka | 360/130.24 |
| 4,623,944 | 11/1986 | Yamashita | 360/84 |
| 4,654,738 | 3/1987 | Kato et al. | 360/108 |
| 5,113,298 | 5/1992 | Fukushima et al. | 360/130.24 |
| 5,119,257 | 6/1992 | Itou et al. | 360/130.24 |
| 5,151,839 | 9/1992 | Ota | 360/108 |
| 5,392,180 | 2/1995 | Hasegawa | 360/130.24 |

FOREIGN PATENT DOCUMENTS

| | | | |
|---|---|---|---|
| 61-196456 | 8/1986 | Japan | 360/130.24 |
| 2110811 | 4/1990 | Japan | 360/130.24 |
| 5166249 | 7/1993 | Japan | 360/130.24 |

*Primary Examiner*—Stuart S. Levy
*Assistant Examiner*—David D. Davis
*Attorney, Agent, or Firm*—Anderson Kill Olick & Oshinsky

[57] ABSTRACT

A head drum ground system for use with a VCR comprises a PCB having a grounding terminal; and an electrical coupler electrically connected to the grounding terminal of the PCB at its opposite ends and resiliently contacted with a lower portion of a rotating shaft of a head drum. In accordance with the present invention, the electrical coupler is utilized so that static electricity generated from a rotating drum be transmitted to the grounding terminal of the PCB board through a rotating shaft.

2 Claims, 2 Drawing Sheets

HEAD DRUM GROUND SYSTEM FOR USE IN A VIDEO CASSETTE RECORDER

FIELD OF THE INVENTION

The present invention relates to a grounding system for use in a video cassette recorder; and, more particularly, to an improved grounding system for removing static electricity generated from a rotational drum in the recorder.

DESCRIPTION OF THE PRIOR ART

A video cassette recorder having a head drum assembly which consists of a rotary drum and a stationary drum, normally includes a grounding system for removing static electricity from the rotary drum. The static electricity generated between the rotating drum and a magnetic tape may create noises to a signal to be reproduced or recorded. Therefore, in order to remove the static electricity from the rotary drum, a grounding system is needed, which electrically connects the rotary drum to a deck or the main chassis.

One of the prior art grounding systems for the head drum assembly is disclosed in U.S. Pat. No. 4,623,944 issued to T. Yamashita, which utilizes a cylindrical member including a tongue and a contactor, said tongue causing the contactor to be slidingly contacted with a rotating shaft. However, it is seen that the complicated structure of said cylindrical member may create difficulties in manufacturing the same. Moreover, since the cylindrical member is supposed to hold onto the stationary drum by its own resilient force alone, all parts of the cylindrical member should be made of a resilient material. That is, not only the biasing means, i.e., the tongue, but also the remainder of the cylindrical member should be made of a resilient material so that the cylindrical member be kept on the stationary drum. As a result, such material requirement of the cylindrical member may entail an increased manufacturing cost thereof.

Another prior art ground system of a common type is illustrated in FIG. 1, together with its head drum assembly. As shown in FIG. 1, this ground system 1 is provided with an extra bracket 2 mounted on a deck 6, a leaf spring 3 secured to the extra bracket 2, and a conductive brush 4 depressed against a rotating shaft 7 by the leaf spring 3. The ground system 1 is further provided with a rubber member 5 attached to an upper surface of the leaf spring 3, said rubber member 5 together with the leaf spring 3 more resiliently urging the brush 4 toward the shaft 7.

These components constitute an electric circuit so that the static electricity may be transmitted to the deck 6 from the rotating drum 9. However, since said prior art ground system 1 is positioned outside the head drum assembly 10, it needs an extra space around the deck 6. Further, the increased number of components may cause the manufacturing process of the ground system to be more laborious and costly.

SUMMARY OF THE INVENTION

It is, therefore, an object of the invention to provide an improved ground system of a head drum assembly which is capable of reducing the number of its components and the space requirement.

Another object of the invention is to provide a ground system having a more simplified structure to thereby facilitate the manufacturing process thereof by way of eliminating the need to employ any separate member for supporting the biasing means.

The above and other objects of the present invention are accomplished by means of a video cassette recorder incorporating therein a ground system for discharging static electricity generated from a head drum assembly therein which includes a rotary drum having a rotating shaft rotatably supported by at least one bearing, and a stationary drum mounted on a deck within the video cassette recorder, said ground system comprising: a printed circuit board ("PCB") having a grounding terminal; and an electrical coupler electrically connected to the grounding terminal of the PCB at its opposite ends and resiliently contacted with a lower segment of the rotating shaft.

In accordance with a preferred embodiment of the present invention, the electrical coupler is a flexible PCB having a electrically conductive member for contacting with the lower segment of the rotating shaft, and an enclosure surrounding said conductive member for resiliently supporting the same and having a cutout portion for allowing a part of the conductive member to be exposed.

In accordance with the present invention, the electrical coupler is utilized so that static electricity generated from the rotating drum be transmitted to the grounding terminal of the PCB through a rotating shaft.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
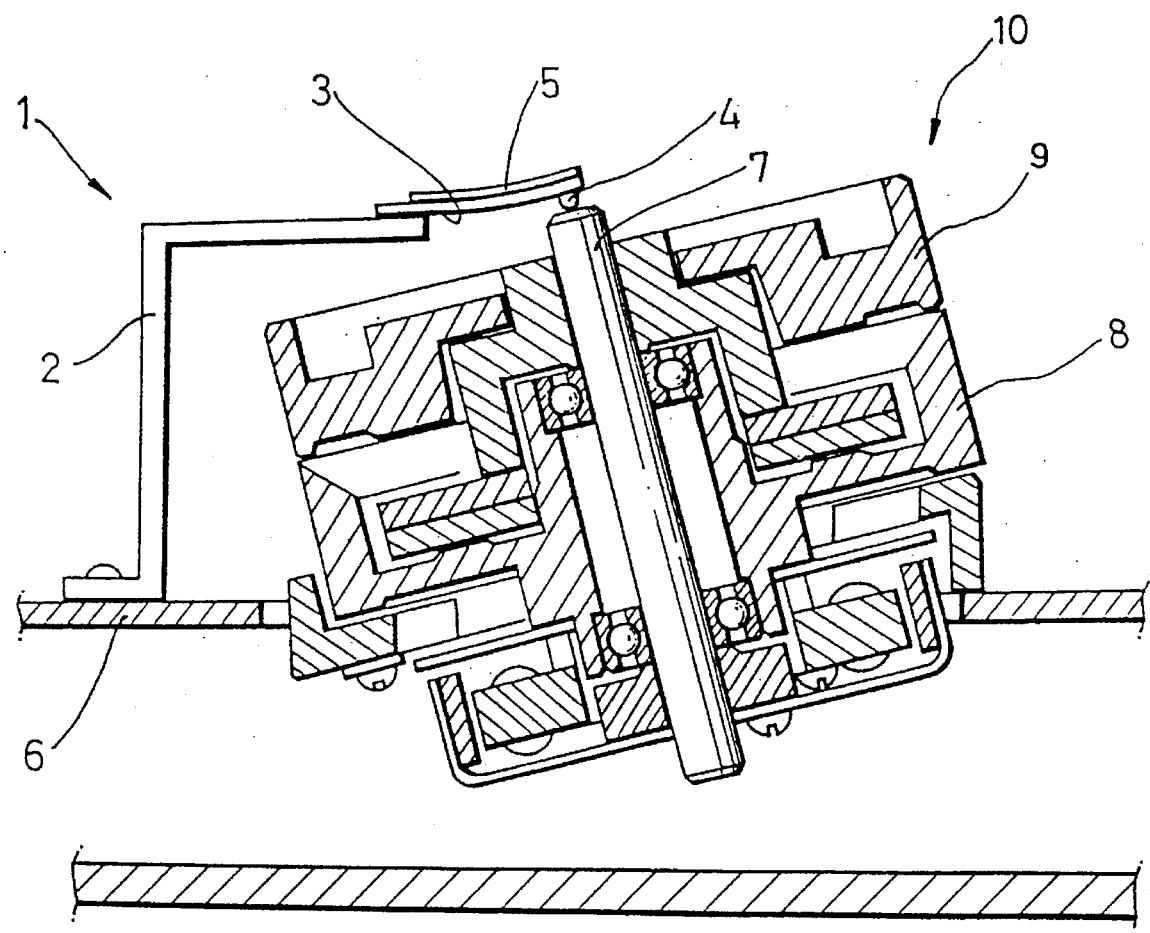
FIG. 1 is a longitudinal sectional view of a head drum assembly incorporating one of the prior art ground systems.
Figure 2:
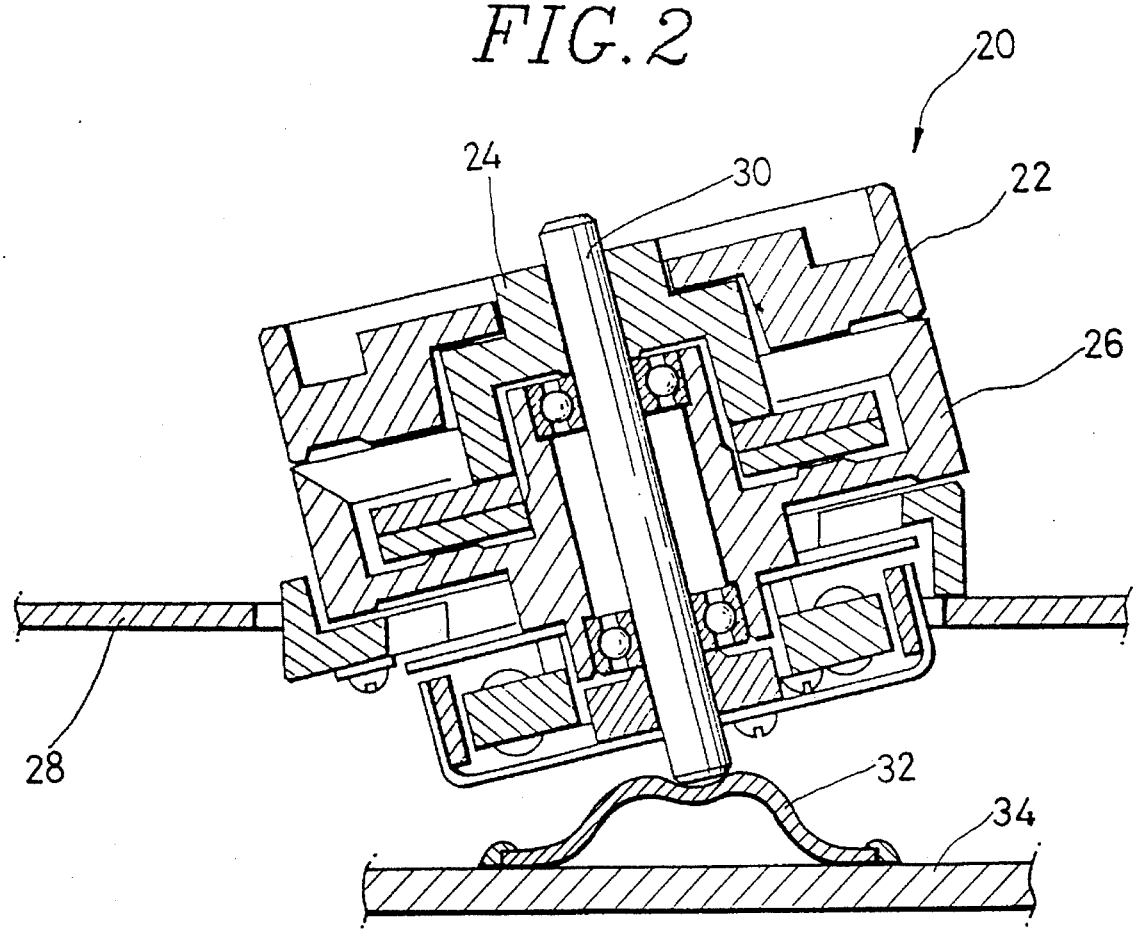
FIG. 2 represents a longitudinal sectional view of a head drum assembly employing a ground system in accordance with the present invention.

Referring to FIG. 2, there is shown a head drum assembly 20 including a ground system in accordance with the present invention. As shown, the head drum assembly 20 is provided with a rotational drum 22 supported by a boss member 24, and a stationary drum 26 fixed on a deck 28.

A rotating shaft 30 closely fitted into the boss member 24 is rotatably supported by a pair of radial bearings which are located at both ends of the stationary drum 26, respectively. The rotating shaft 30 comes in contact with a electrical coupler 32 directly secured to a grounding terminal 33 (see FIG. 3) of a PCB 34.

Figure 3:
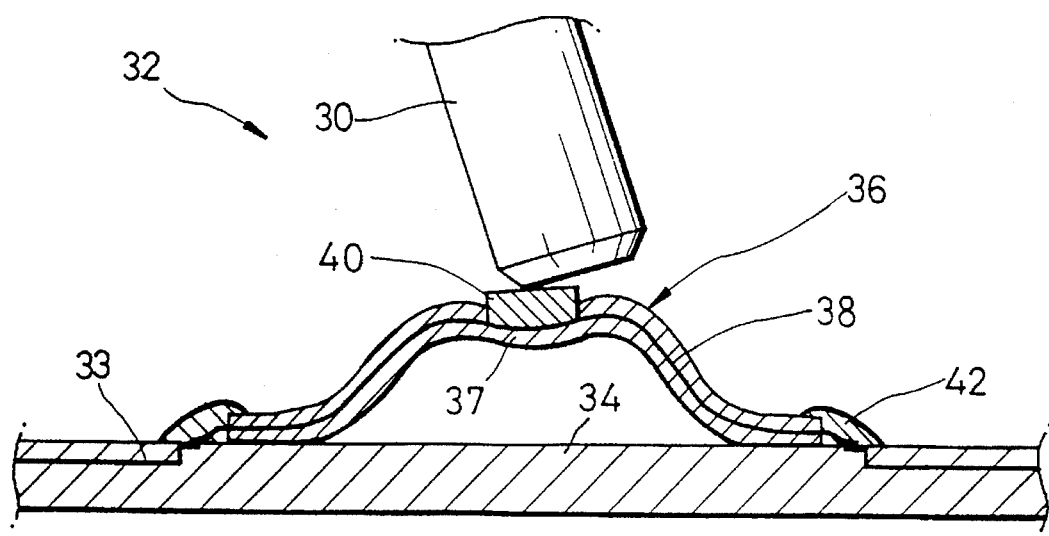
FIG. 3 provides an enlarged sectional view of the electrical coupler shown in FIG. 2.

FIG. 3 illustrates an enlarged sectional view of the electrical coupler 32 shown in FIG. 2. As shown, the rotating shaft 30 is electrically connected to the PCB via an electrical coupler 32 including an electrically conductive member 38 fixed to the PCB 34 at its opposite ends by using fixing means, e.g., brazing or soldering 42. The conductive member 38 is surrounded by an enclosure 37 so that it can resiliently contact with the rotating shaft 30. The enclosure 37 has a cutout portion wherein the conductive member 38 is exposed to contact with the rotating shaft 30. A layer of carbon 40 may preferably be provided at the exposed portion of the conductive member 38 to thereby prevent the conductive member 38 from wearing out. Consequently, the static electricity generated from the rotating drum 22 is transmitted to the grounding terminal 33 of the PCB 34, through a boss member 24, the rotating shaft 30, and the electrical coupler 32, in that order.

Although the invention has been shown and described with respect to the preferred embodiments, it will be understood by those skilled in the art that various changes and modifications may be made without departing from the spirit and scope of the invention as defined in the following claims.

What is claimed is:

1. A video cassette recorder incorporating therein a ground system for discharging static electricity generated from a head drum assembly therein which includes a rotary drum having a rotating shaft rotatably supported by at least one bearing, and a stationary drum mounted on a deck within the video cassette recorder, said ground system comprising:

a printed circuit board having a grounding terminal; and an electrical coupler electrically connected to the grounding terminal of the printed circuit board at its opposite ends and resiliently contacted with a lower segment of the rotating shaft, said electrical coupler being a flexible printed circuit board having an electrically conductive member for contacting with the lower segment of the rotating shaft and an enclosure surrounding said conductive member for resiliently supporting the same, the enclosure having a cutout portion for allowing a part of the conductive member to be exposed.

2. The video cassette recorder as recited in claim 1, wherein said exposed part of the conductive member is coated with a layer of carbon.

* * * * *